United States Patent [19]

Haraguchi

[11] Patent Number: 4,955,635
[45] Date of Patent: Sep. 11, 1990

[54] SUSPENSION OF VEHICLE HAVING LINKS ARRANGED TO INTERSECT A COMMON INBOARD PIVOT AXIS

[75] Inventor: Tetsunori Haraguchi, Susono, Japan
[73] Assignee: Toyota Jidosha Kabushiki Kaisha, Japan
[21] Appl. No.: 339,251
[22] Filed: Apr. 17, 1989

[30] Foreign Application Priority Data

Apr. 19, 1988 [JP] Japan ................................. 63-95999

[51] Int. Cl.$^5$ .............................................. B60G 3/26
[52] U.S. Cl. .................................. 280/675; 280/688; 280/689
[58] Field of Search ............... 280/688, 689, 690, 707, 280/701, 675

[56] References Cited

U.S. PATENT DOCUMENTS

| | | | |
|---|---|---|---|
| 1,529,182 | 3/1925 | Holle | 280/91 |
| 3,415,535 | 10/1968 | Famard | 280/688 |
| 3,520,554 | 7/1970 | Ravenel | 280/688 |
| 3,883,153 | 5/1975 | Sineh et al. | 280/688 |

FOREIGN PATENT DOCUMENTS 59-39205 3/1984 Japan .
2172254 9/1986 United Kingdom .

Primary Examiner—Richard A. Bertsch
Attorney, Agent, or Firm—Oliff and Berridge

[57] ABSTRACT

In the suspension for mounting a wheel supporting member such as a spindle or an axle bearing for rotatably supporting a wheel to the vehicle body by a plurality of links in a manner of allowing bounding and rebounding of the wheel relative to the vehicle body, the links are so arranged that the central axes of the links intersect a common straight line on the inboard side thereof when the wheel supporting member is at its neutral position between bounding and rebounding displacements thereof.

7 Claims, 2 Drawing Sheets

SUSPENSION OF VEHICLE HAVING LINKS ARRANGED TO INTERSECT A COMMON INBOARD PIVOT AXIS

BACKGROUND OF THE INVENTION

1. Field of the Invention

The prewsent invention relates to a suspension for a vehicle such as an automobile.

2. Description of the Prior Art

The suspension of a vehicle such as an automobile is generally constructed of several link members extended between the vehicle body and a wheel supporting member such as a spindle or an axle bearing which supports a wheel to be rotatable about an axis of rotation. For example, a double wishbone type suspension has two sets of wishbone arms each including a pair of link members joined at a pivot point on the side of the vehicle supporting member and arranged as vertically spaced so as to provide an upper and a lower arm. Further, another link member is generally provided for restricting the toe adjustment of the wheel. In co-pending patent application No. 339,120 filed Apr. 17, 1989 by the same applicant is disclosed an embodiment of a suspension for a rear wheel constructed of five separate links and adapted to effectively suppress the rolling of the vehicle body in turning of the vehicle under acceleration and deceleration.

In such double wishbone suspensions or multi-link suspensions, in some arrangements of the extending directions of the respective links it is probable that in the bounding and rebounding of the wheel the rubber bushes incorportated in the pivot points at opposite ends of the links are wrenched, and the riding quality of the vehicle is thereby deteriorated. In general, the central axes of those links which principally support the wheel supporting member from the vehicle body intersect several certain phantom straight lines positioned on an inboard side thereof so as to allow the wheel supporting member to swing up and down for the bounding and rebounding movement of the wheel and a common phantom straight line on an outboard side thereof to allow the wheel supporting member to turn about such a common phantom straight line to adjust the toeing of the wheel, while the link which principally operates to maintain or change the toe of the wheel and therefore operates a tie rod or a control arm intersects none of those phantom straight lines. Therefore, in the bounding and rebounding of the wheel the link operating as a tie rod or a control arm applies a restricting force against the pivoting movement of the wheel supporting member, and therefore the rubber bushes incorporated in the end portions of the links, particularly those incorporated in the end portions on the side of the wheel supporting member, are apt to be wrenched, thus sometimes obstructing smooth pivoting movement of the links and causing deterioration of the riding quality of the vehicle.

In Japanese Utility Model Laying-open Publication 59-39205 filed by the same assignee as that of the present application it has been proposed to arrange the control arm in a strut type suspension so that the pivot axis of the control arm on the side of the vehicle body passes through the pivot point of the strut bar on the side of the vehicle. In the suspension of this prior proposal the damaping function of the rubber bushes incorporated in the pivot points of the control arm and the strut bar on the side of the vehicle body is improved, and thereby the riding quality of the vehicle can be improved.

However, even in such a suspension it is still not possible to dissolve the wrenching applied to the rubber bush in the upper mount pivotably supporting an upper end of the shock absorber. Further, the above-mentioned prior proposal is only applicable to the strut type suspension.

SUMMARY OF THE INVENTION

In view of the above-mentioned problems in the conventional suspensions for a vehicle, it is the object of the present invention to provide a suspension for a vehicle constructed to avoid or reduce twisting or wrenching applied to the rubber bushes incorporated in the end portions of the links, particularly those on the side of the wheel supporting member, so that the pivoting operation of the links is made more smooth and the riding quality of the vehicle is thereby improved.

According to the present invention, the above-mentioned object is accomplished by a suspension of a vehicle for mounting a wheel to a vehicle body in a manner of allowing bounding and rebounding of the wheel, comprising: a wheel supporting member for supporting the wheel to be rotatable about an axis of rotation, and a plurality of links including a first group thereof supporting said wheel supporting member from the vehicle body principally for bounding and rebounding movement of the wheel relative to the vehicle body and a second group thereof principally restricting toe changing movement of said wheel relative to the vehicle body, each being pivotably connected at one end thereof with said wheel supporting member and at another end thereof with the vehicle body, wherein said first and second groups of links are so arranged that, when said wheel supporting member is at a predetermined standard position thereof between bounding and rebounding displacements thereof, a central axis of each said link intersects a first phantom straight line on an inboard side thereof.

By the above-mentioned construction, when the wheel moves up and down within a very small range from the above-mentioned standard position, the wheel supporting member and the links swing about the above-mentioned first phantom straight line as an integral unit as if they pivot about a momentary axis of rotation coinciding with said first phantom straight line, and therefore the rubber bushes incorporated in the pivot points of the links on the side of the vehicle supporting member are not wrenched. Further, even when the wheel supporting member bounds or rebounds in a relatively large range from the above-mentioned standard position, the rubber bushes incorporated in the pivot points of the links on the side of the vehicle supporting member are subject to relatively low twisting or wrenching, and therefore the up and down swinging of the suspension is made more smooth, and the riding quality of the vehicle is improved.

The central axis of each said first group link may intersect a second phantom straight line skewed relative to said first phantom straight line on an outboard side thereof. In this case, the above-mentioned second phantom straight line provides a momentary central axis for the pivoting movement of the wheel supporting member relative to the suspension linkage in the fore-and-aft direction of the vehicle.

Further, by the above-mentioned construction, since the amounts of wrenching and twisting applied to the rubber bushes incorporated in the pivoting points of the links on the side of the wheel supporting member are reduced, the life of the rubber bushes is improved as compared with the conventional suspensions. Further, since the amounts of wrenching and twisting applied to the rubber bushes are small, they may be made of harder rubber than in the rubber bushes used in the conventional suspensions, and therefore the size of the rubber bushes can be decreased with corresponding decrease in the cost.

According to a detailed feature of the present invention, the above-mentioned predetermined standard position is substantially a neutral position between the bounding and rebounding of the vehicle. Generally in a vehicle such as an automobile, the wheel is normally positioned at such a neutral position and occasionally bounds and rebounds from the neutral position, and therefore, the wrenching or the twisting applied to the rubber bushes incorporated in the pivot points of the links on the side of the wheel supporting member is minimized by the above-mentioned arrangement, and the riding quality of the vehicle is more effectively improved.

The suspension for a vehicle according to the present invention may also be so constructed as described in the specification of the co-pending application No. 337,120 filed by the same applicant, so that said first through fourth links are arranged in such a manner that, as seen in a side view of the vehicle, the center of rotation of the wheel draws a trace of movement which is substantially a vertical straight line and the momentary ground contact point of the wheel draws a trace of movement which is substantially an arc having a point of curvature positioned forward and upward of the wheel according to the bounding and rebounding of the wheel.

In the following the present invention is described in detail with respect to preferred embodiments thereof with reference to the accompanying drawings.

BRIEF DESCRIPTION OF THE DRAWINGS

In the accompanying drawings.

DESCRIPTION OF THE PREFERRED EMBODIMENTS

Figure 1:
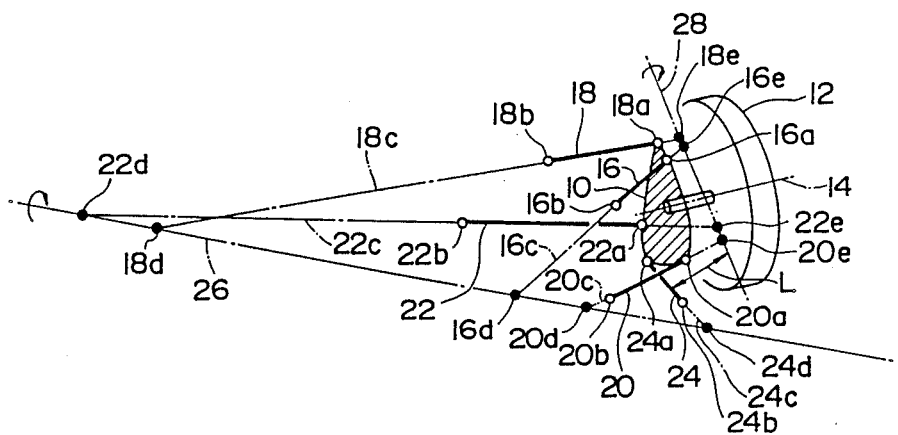
FIG. 1 is a diagrammatically perspective view seen from a point obliquely forward of the vehicle of an embodiment of the suspension for a vehicle according to the present invention constructed as a multi-link type suspension.

Referring to FIG. 1, 10 designates a wheel supporting member for supporting a wheel 12 to be rotatable about an axis of rotation 14. The wheel supporting member 10 is supporting from a vehicle body not shown in the figure via links 16, 18, 20, 22 and 24 pivotably connected at one ends thereof with the wheel supporting member 10 at pivot points 16a, 18a, 20a, 22a, and 24a, 212 thereof with the vehicle body at pivot points 16b, 18b, 20b, 22b and 24b, respectively.

In the shown embodiment, when the wheel 12 is at a neutral position in the bounding and rebounding displacement thereof, i.e., at a position of no bounding and no rebounding, central axes 16c, 18c, 20c and 22c of the links 16-22 intersect a first phantom straight line 26 on an inboard side thereof of a points 16d, 18d, 20d and 22d, respectively, and also intersect a second phantom straight line 28 on an outboard side thereof at points 16e, 18e, 20e and 22e, center line 24c of the fifth link 24 intersects the phantom straight line 26 at a point 24d, and extends as displaced from said second phantom straight line 28 by a distance L, without intersecting said second phantom straight line. Thus, the first phantom straight line 26 is a momentary central axis of the bounding and rebounding of the wheel 12 up and down from the position shown in the figure, while the second phantom straight line 28 is a pivot axis for toe changes of the wheel 12, i.e. the axis of the so called king pin.

Therefore, when the wheel 12 bounds and rebounds up and down from the position shown in the figure within a very small range, the links and the wheel supporting member swing as a unitary body around the phantom straight line 26, so that the rubber bushes incorporated in the pivoting portions of the links on the side of the wheel supporting member 10 are subject to no wrenching and no twisting. Even when the wheel bounds or rebounds to a relatively large extent, the wrenching and twisting applied to the rubber bushes are still relatively low, and therefore the links can pivot relatively smoothly, thus improving the riding quality of the vehicle.

Further, since the center line 24c of the fifth link 24 is maintained as displaced from the phantom straight line 28 by the distance L regardless of the bounding and rebounding of the wheel 12, the smooth pivoting of the links 16-22 is not obstructed, and therefore the rigidity of the suspension against the fore-and-aft movement and the toe change is ensured.

Figure 2:
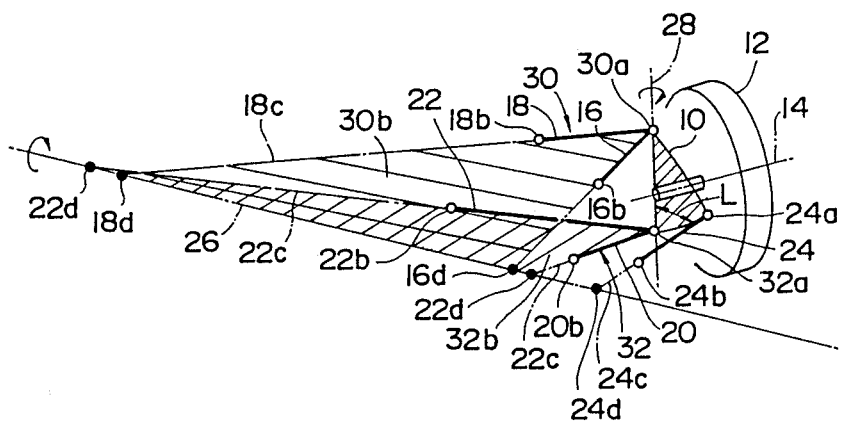
FIG. 2 is a diagrammatically perspective view seen from a point obliquely forward of the vehicle of another embodiment of the suspension for a vehicle according to the present invention constructed as a double wishbone type suspension in which the upper and lower arms are A-type arms.

FIG. 2 is a schematic perspective view of another embodiment of the suspension for a vehicle according to the present invention seen from a point obliquely forward thereof in which the suspension is constructed as a double wishbone type suspension including upper and lower arms constructed in the form of an A-type arm. In FIG. 2, the portions corresponding to those shown in FIG. 1 are designated by the same reference numerals as in FIG. 1.

In this embodiment, the links 16 and 18 are provided in the form of an A-type arm working as an upper arm 30 pivotably connected at a common pivot point 30a with the wheel supporting member 10, and the links 20 and 22 are provided in the form of an A-type arm working as a lower arm 32 pivotably connected at a common pivot point 32a with the wheel supporting member 10. In this embodiment, therefore, the second phantom straight line 28 is a pivot axis passing through the pivot points 30a and 32a, said pivot axis being an axis around which the wheel is steered, and corresponding to the axis of the king pin.

In other portions this embodiment is constructed in the same manner as the embodiment shown in FIG. 1, that is, said first phantom straight line 26 is defined by an intersection of a phantom plane 30b defined by the pivot points 30a, 16b and 18b of the upper arm 30 with a phantom plane 32b defined by the pivot points 32a, 20b and 22b of the lower arm 32. In this embodiment, the links are pivoted smoothly, and therefore good riding quality is ensured as in the embodiment shown in FIG. 1.

Figure 3:
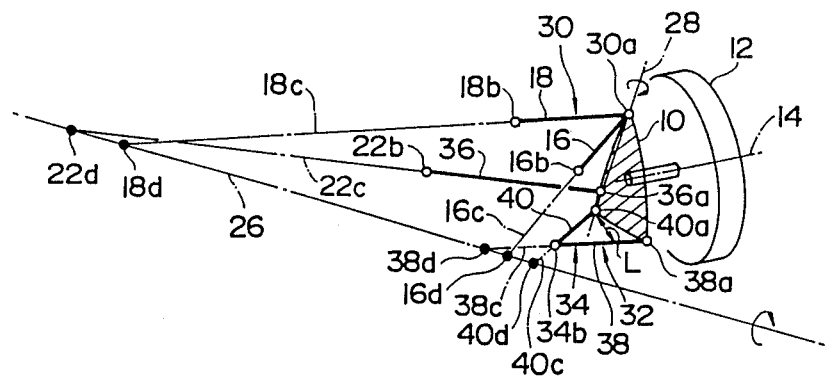
FIG. 3 is a diagrammatically perspective view seen from a point obliquely forward of the vehicle of still another embodiment of the suspension for a vehicle according to the present invention constructed as a double wishbone type suspension in which the upper arm is an A-type arm and the lower arm is a combination of an inverse A-type arm and an I-type arm.

FIG. 3 is a schematic perspective view of still another embodiment of the suspension for a vehicle according to the present invention constructed as a double wishbone type suspension in which an upper arm is an A-type arm and a lower arm is a combination of an inverse A-type arm and an I-type arm, the view being seen from an obliquely forward position thereof. In FIG. 3, the portions corresponding to those shown in FIGS. 1 and 2 are designated by the same reference numerals as in FIGS. 1 and 2.

In this embodiment, the lower arm 32 includes an inverse A-type arm 34 and an I-type arm 36. The inverse A-type arm 34 has two links 38 and 40 pivotably connected at one ends thereof with the vehicle supporting member 10 at two pivot points 38a and 40a spaced from one another in the longitudinal direction of the vehicle, and pivotably connected at other ends thereof with the vehicle body not shown in the figure at a common pivot point 34b. The I-type arm 36 is pivotably connected at one end thereof with the vehicle supporting member 10 at a pivot point 36a and at another end therof with the vehicle body not shown in the figure at a pivot point 22b.

The pivot point 30a of the upper arm 30 on the side of the wheel supporting member and the pivot points 36a and 40a define a king pin axis which coincides with the second phantom straight line 28. The central axis 38c of the link 38 intersects the first phantom straight line 26 at a point 38d, and is spaced from the second phantom straight line 28 by a distance L.

In this embodiment, therefore, the link 40 and the I-type arm 36 provide in combination a virtue A-type arm. Therefore, this embodiment has the same structure as the embodiment shown in FIG. 1, except that the link 38 operates as a toe control arm. Therefore, in this embodiment the links pivot smoothly, and good riding quality is thereby ensured.

Figure 4:
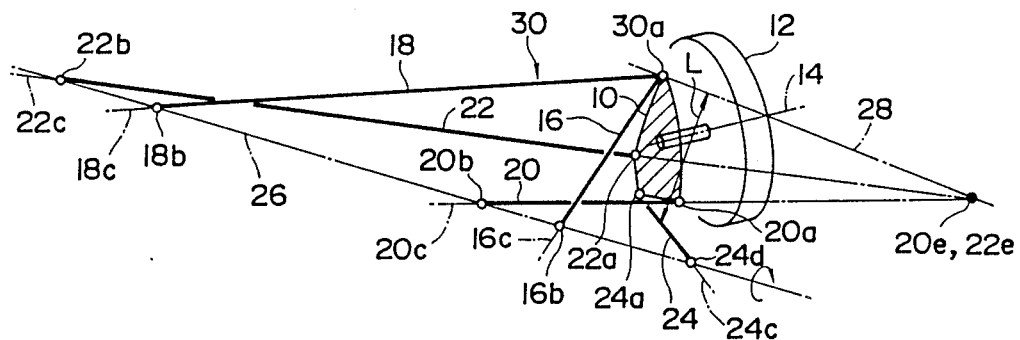
FIG. 4 is a diagrammatically perspective view seen from a point obliquely forward of the vehicle of a modification of the embodiment shown in FIG. 1.

FIG. 4 is a diagrammatically perspective view of a modification of the embodiment shown in FIG. 1 seen from an obliquely forward position thereof. In FIG. 4, the portions corresponding to those shown in FIGS. 1 and 2 are designated by the same reference numerals in those figures.

In this embodiment the pivot points 16b, 18b, 20b, 22b and 24b of the links 16-24 on the side of the vehicle body are positioned on the first phantom straight line 26, and therefore the link structure of this embodiment is a one freedom link structure in which the wheel supporting member 10 and the wheel 12 pivot about the first phantom straight line 26 regardless of the amount of bounding and rebounding of the wheel. In this embodiment, no twisting or wrenching is applied to the rubber bushes incorporated in the pivot points of the links on the side of the vehicle supporting member, while the wheel supporting member and the wheel swing about the straight line 26 as a unitary body, and the riding quality of the vehicle is further improved.

Although the present invention has been described with respect to several embodiments thereof, it will be clear to those skilled in the art that the present invention is not limited to these embodiments, and other various embodiments are possible within the scope of the present invention.

I claim:

1. A suspension of a vehicle for mounting a wheel to a vehicle body in a manner of allowing bounding an rebounding and toe change movement of the wheel, comprising:

a wheel supporting member for supporting the wheel to be rotatable about an axis of rotation, and a plurality of links each being pivotably connected at one end thereof with said wheel supporting member and at another end therof with the vehicle body, said plurality of links including a first group of links comprising at least one upper link and at least one lower link for supporting said wheel supporting member from the vehicle body principally for bounding and rebounding movement of the wheel relative to the vehicle body regulated by an angular deformation of a quadrilateral formed of said upper and lower links and spanning portions of said wheel supporting member and the vehicle body extending between points thereof for pivotal connection with said upper and lower links and a second group of links for principally restricting toe change movement of the wheel relative to the vehicle body, wherein said first and second groups of links are so arranged that when said wheel supporting member is at a predetermined standard position between bounding and rebounding displacements thereof, a central axis of each said link intersects a first phantom straight line on an inboard side thereof.

2. A suspension to claim 1, wherein the central axis of each said first group link intersects a second phantom straight line skewed relative to said first phantom straight line on an outboard side thereof.

3. A suspension according to claim 1, wherein said suspension is of a double wishbone type including an upper wishbone arm and a lower wishbone arm formed by said first group of links.

4. A suspension according to claim 3, wherein said upper wishbone arm is formed as an A-type arm.

5. A suspension according to claim 3, wherein said lower wishbone arm is formed as an A-type arm.

6. A suspension according to claim 3, wherein said lower wishbone arm is formed as a combination of an inverse A-type arm and an I-type arm.

7. A suspension according to claim 1, wherein the points of pivotable connection of said first and second groups of links are on said first phantom straight line.

* * * * *